(12) United States Patent
Moynihan, III

(10) Patent No.: US 6,796,274 B1
(45) Date of Patent: Sep. 28, 2004

(54) DOG CONTROL APPARATUS

(76) Inventor: John L. Moynihan, III, 643 NE. 18th Ave., Fort Lauderdale, FL (US) 33304

(*) Notice: Subject to any disclaimer, the term of this patent is extended or adjusted under 35 U.S.C. 154(b) by 0 days.

(21) Appl. No.: 10/406,508

(22) Filed: Apr. 3, 2003

(51) Int. Cl.⁷ .............................................. A01K 15/04
(52) U.S. Cl. .......................... 119/831; 119/856; 54/24; 54/6.2
(58) Field of Search ................................ 119/831, 832, 119/858, 856, 857; 54/24, 85, 6.2, 6.1

(56) References Cited

U.S. PATENT DOCUMENTS

| | | | | |
|---|---|---|---|---|
| 356,627 | A | * | 1/1887 | Dowlin ........................... 54/85 |
| 417,638 | A | * | 12/1889 | Harmon .......................... 54/24 |
| 1,351,140 | A | * | 8/1920 | Stoker ......................... 119/831 |
| 1,532,853 | A | * | 4/1925 | Aguilar ........................ 54/6.2 |
| 1,633,268 | A | * | 6/1927 | Nelson et al. .................. 54/24 |
| 2,622,381 | A | * | 12/1952 | Mundell ........................ 54/24 |
| 3,263,399 | A | * | 8/1966 | Faragher ....................... 54/6.1 |
| 4,483,275 | A | | 11/1984 | De Groot |
| 4,566,255 | A | | 1/1986 | DeGroot |
| 5,038,717 | A | * | 8/1991 | Bent ........................... 119/815 |
| 5,079,904 | A | * | 1/1992 | Berube .......................... 54/6.2 |
| 5,086,611 | A | * | 2/1992 | Purdy ............................ 54/24 |
| 5,088,272 | A | | 2/1992 | Anderson |
| D378,150 | S | * | 2/1997 | DuBarry .................... D30/152 |
| 5,732,660 | A | | 3/1998 | David |
| 5,992,352 | A | * | 11/1999 | Borchelt et al. ............ 119/856 |
| D458,717 | S | * | 6/2002 | Mugford .................... D30/152 |
| 6,516,748 | B1 | * | 2/2003 | Jackson ........................ 119/72 |
| 6,595,156 | B1 | * | 7/2003 | Curran ........................ 119/831 |

* cited by examiner

Primary Examiner—Robert P. Swiatek
Assistant Examiner—Joan M. Olszewski
(74) Attorney, Agent, or Firm—Alvin S. Blum

(57) ABSTRACT

A combination dog collar and control halter has a muzzle assembly with a cinching muzzle loop that can be operated by tension on the leash to lower the dog's head. The muzzle assembly is removably attached to the dog collar by two side members on the muzzle assembly that connect to two rings on the collar that are disposed on opposite sides of the dog's head. The collar can be worn as a conventional collar. The muzzle assembly is easily attached to the two rings when needed by simple connectors.

9 Claims, 3 Drawing Sheets

DOG CONTROL APPARATUS

This invention relates to dog control apparatus, and more particularly to a combination collar and muzzle loop that are used with a leash to effectively control and train a dog.

BACKGROUND OF THE INVENTION

Various halters have been developed to enhance control of a dog. U.S. Pat. Nos. 4,483,275 and 4,566,255 issued to DeGroot provide for control halters featuring a combination of collar and muzzle with the muzzle being connected to the collar portion by three or four connecting members. The apparatus cannot be applied or removed without also applying or removing the collar. This makes the use of the apparatus difficult with an uncooperative animal. U.S. Pat. No. 5,732,660 issued to David teaches a muzzle loop on the leash that only passes through a single cinch ring on the collar. This provides for a poorly stabilized loop that too easily rotates about the muzzle and is too close to the collar.

SUMMARY OF THE INVENTION

It is accordingly an object of the invention to provide a dog control apparatus that includes a collar assembly that can be readily used as a conventional collar and that enables the user to apply a muzzle loop portion by simply snapping on two connectors to the collar. This is especially helpful for animals that are difficult to handle. It is another object of the invention that the muzzle loop be spaced away from the collar and stabilized in position. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
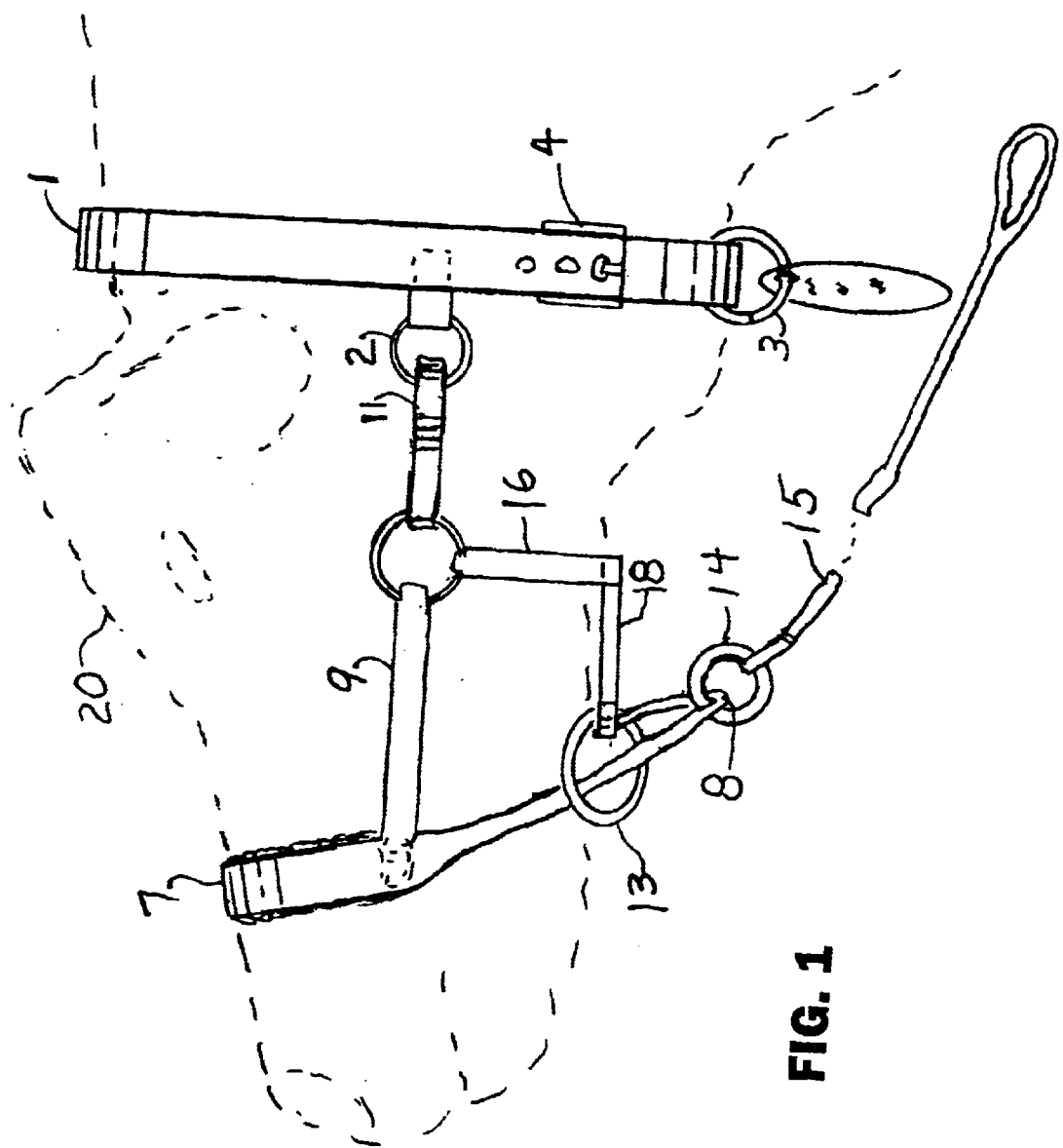
FIG. 1 is a side view of the apparatus of the invention in use with a dog shown in phantom.
Figure 2:
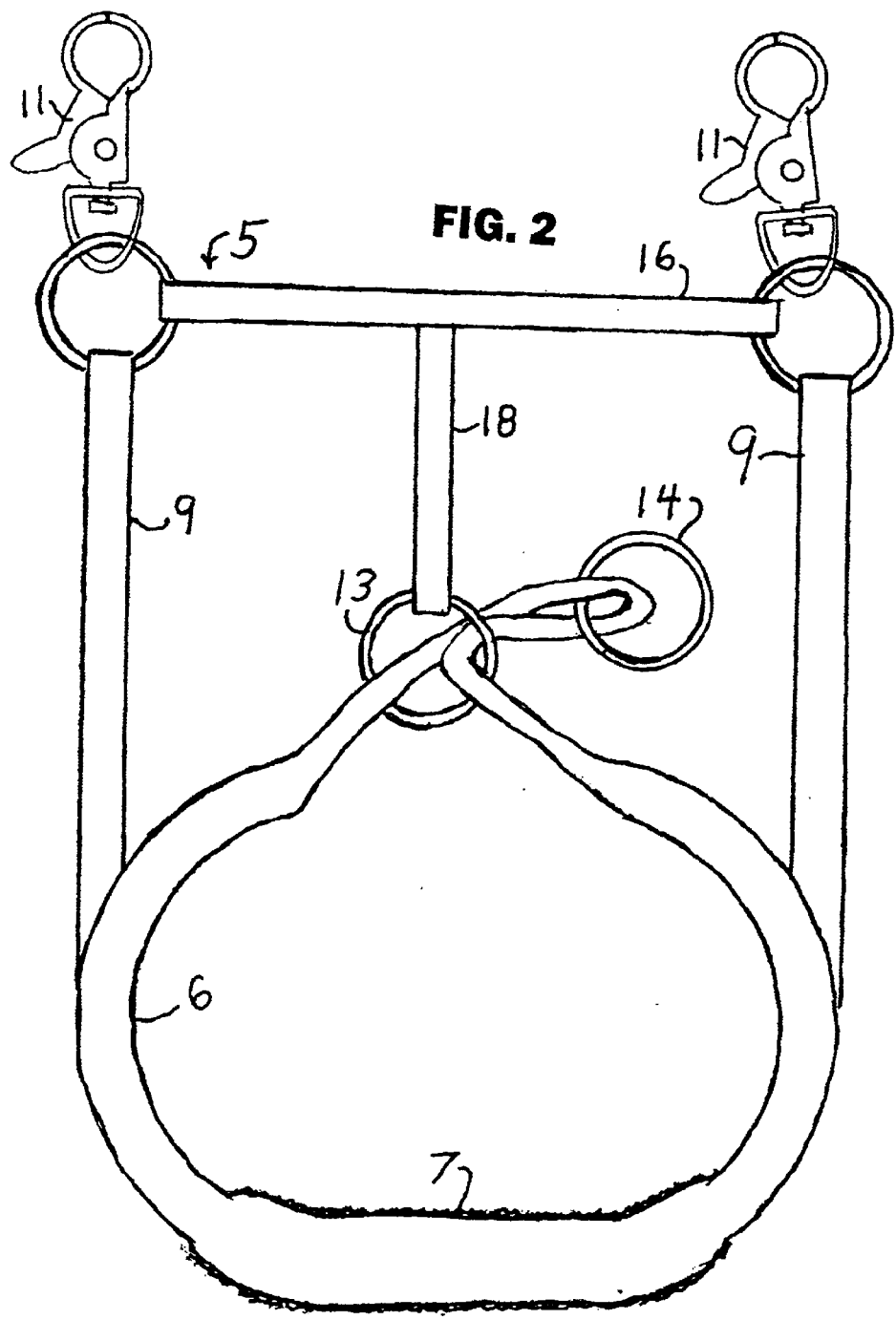
FIG. 2 is a top view of the muzzle assembly of the invention without the collar member.
Figure 3:
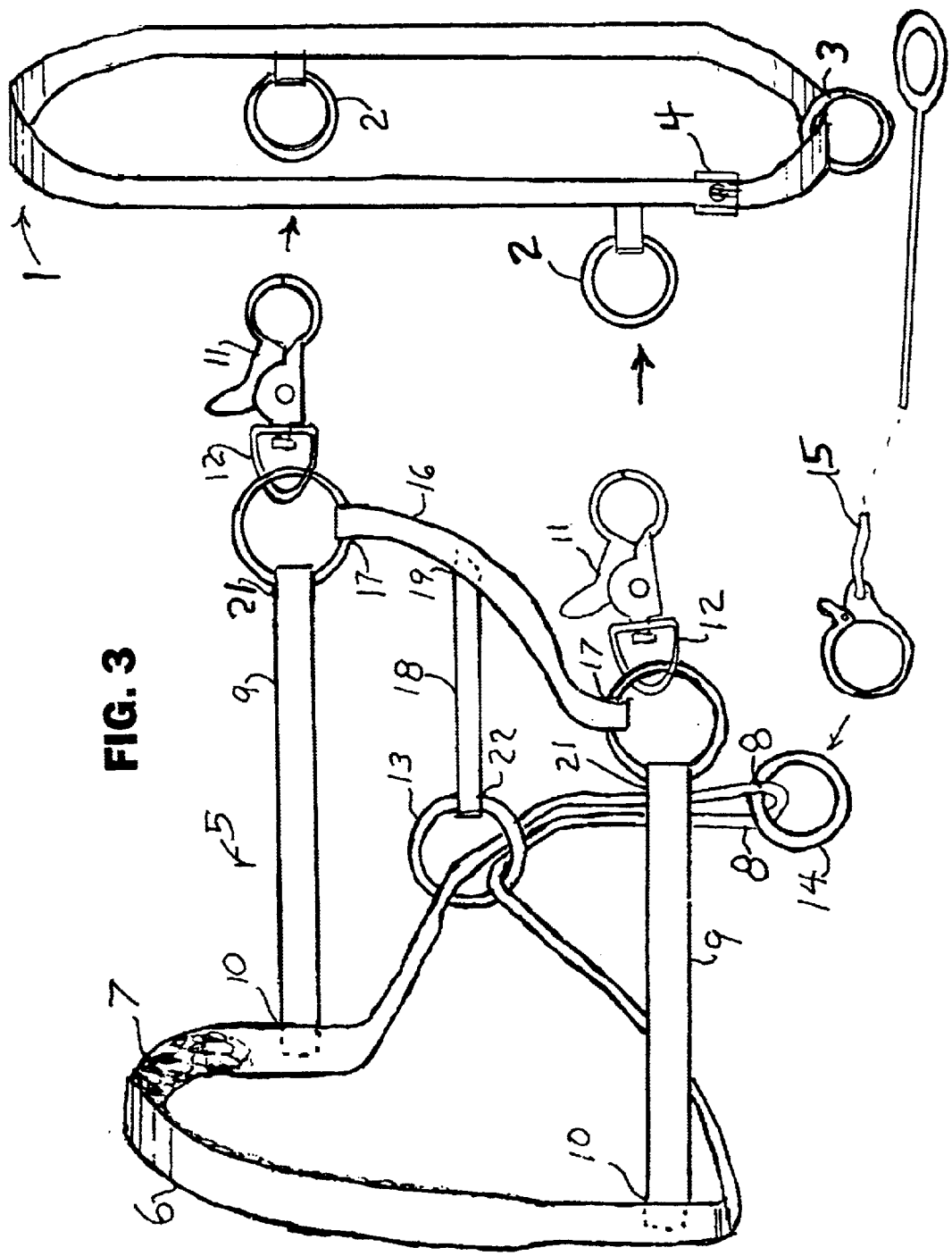
FIG. 3 is a perspective view of the apparatus of the invention with the collar assembly separated from the muzzle assembly.

Referring now to the drawing FIGS. 1–3, a collar member 1 has a size adjusting buckle 4, and an attachment 3 for a dog license as are well known in the art, so that it can serve as a conventional dog collar. This makes it much easier to convert the apparatus to a control halter when needed. Two rings 2 are attached to the collar disposed so as to be positioned on opposite sides of the dog's head 20 (shown in phantom). A muzzle assembly 5 includes a muzzle loop 6 having a padded upper portion 7 for comfortably engaging the upper surface of the dog's muzzle and two end portions 8. A pair of side members 9 have a first end 10 affixed to the loop below the upper portion, so that one will be on each side of the muzzle. A second end 21 of each side member 9 is provided with a swivel 12 and a releasable connector 11 for snapping onto the rings 2 of the collar member 1 to easily convert the apparatus to a control harness, after slipping the muzzle loop over the dog's muzzle.

The end portions 8 of the loop pass through a cinch ring 13 and terminate at a common connector 14 for removably connecting a leash 15. A joining member 16 has an end 17 attached to each side member so as to pass beneath the dog's head. A coupling member 18 has a first end 19 attached intermediate the ends of the joining member. A second end 22 of the coupling member is attached to the cinch ring 13. This stabilizes the ring location, so that tension on the leash tends to lower the head.

While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A control apparatus for a dog comprising:
   a) a collar member for encircling the dog's neck;
   b) a pair of rings affixed to the collar member, the rings disposed so as to be on opposite sides of the dog's neck, the rings being the sole means of attaching components that convert the collar member to a control halter;
   c) means for holding a license tag on the collar member so that the collar member may remain on the dog for use as an ordinary dog collar when a halter is not required;
   d) a muzzle assembly including:
      i) a muzzle loop having a padded upper portion for engaging the upper surface of the dog's muzzle and two end portions;
      ii) a pair of side members, each side member having a first end affixed to the muzzle loop, one side member on each side of the muzzle loop below the upper portion of the muzzle loop;
      iii) a releasable connector at a second end of each side member, the releasable connector constructed for removably engaging the two rings on the collar member when the apparatus is to be used as a halter;
      iv) the end portions passing through a cinch ring and terminating past the cinch ring in a common connector adapted for engaging a leash;
      v) a joining member having an end affixed to each side member, so as to pass under the dog's head; and
      vi) a coupling member affixed at a first end to the joining member substantially intermediate the two ends of the joining member, the coupling member being affixed to the cinch ring at a second end, the coupling member being arranged so as to be beneath the dog's head.

2. The control apparatus according to claim 1, in which the releasable connectors include swivels.

3. The control apparatus according to claim 1, in which the collar member includes adjustment means for adapting to necks of different sizes.

4. A control apparatus for a dog comprising:
   a) a collar member for encircling the dog's neck;
   b) a pair of rings affixed to the collar member, the rings disposed so as to be on opposite sides of the dog's neck, the rings being the sole means of attaching components that convert the collar member to a control halter;
   c) means for holding a license tag on the collar member so that the collar member may remain on the dog for use as an ordinary dog collar when a halter is not required;
   d) a muzzle assembly including:
      i) a muzzle loop having a padded upper portion for engaging the upper surface of the dog's muzzle and two end portions;

ii) a pair of side members, each side member having a first end affixed to the muzzle loop, one side member on each side of the muzzle loop below the upper portion of the muzzle loop;
iii) a releasable connector at a second end of each side member, the releasable connector constructed for removably engaging the two rings on the collar member when the apparatus is to be used as a halter;
iv) the end portions passing through a cinch ring and terminating past the cinch ring in a common connector adapted for engaging a leash;
v) a joining member having an end affixed to each side member, so as to pass under the dog's head; and
vi) a coupling member affixed at a first end to the joining member substantially intermediate the two ends of the joining member, the coupling member being affixed to the cinch ring at a second end, the cinch ring and coupling member being arranged so as to be beneath the dog's head such that tension on a leash engaging the common connector will pull the dog's head down for enhanced control.

5. The control apparatus according to claim 4, in which the releasable connectors include swivels.

6. The control apparatus according to claim 5, in which the collar member includes adjustment means for adapting to necks of different sizes.

7. A control apparatus for a dog comprising:
a) a collar member for encircling the dog's neck;
b) a pair of rings affixed to the collar member, the rings disposed so as to be on opposite sides of the dog's neck, the pair of rings being the sole means of removably attaching components that reversibly convert the collar member to a control halter;
c) means for holding a license tag on the collar member so that the collar member may remain on the dog for use as an ordinary dog collar when a halter is not required;
d) a muzzle assembly including:
i) a muzzle loop having a padded upper portion for engaging the upper surface of the dog's muzzle and two end portions;
ii) a pair of side members, each side member having a first end affixed to the muzzle loop, one side member on each side of the muzzle loop below the upper portion of the muzzle loop;
iii) a releasable connector at a second end of each side member, the releasable connector constructed for removably engaging the two rings on the collar member when the apparatus is to be used as a halter and so that removal of said releasable connectors will be all that is necessary to return the collar to its original function as a collar; and
iv) the end portions passing through a cinch ring and terminating past the cinch ring in a common connector adapted for engaging a leash.

8. The control apparatus according to claim 7, in which the releasable connectors include swivels.

9. The control apparatus according to claim 8, in which the collar member includes adjustment means for adapting to necks of different sizes.

\* \* \* \* \*